(12) United States Patent  
Stuchlik et al.

(10) Patent No.: US 7,185,397 B2
(45) Date of Patent: Mar. 6, 2007

(54) FLOOR CLEANING MACHINE

(75) Inventors: William R. Stuchlik, Rogers, AR (US); Leonard W. Rowan, Westville, OK (US); William J. Bukowski, Scottsdale, AZ (US)

(73) Assignee: Alto U.S. Inc., Springdale, AR (US)

( * ) Notice: Subject to any disclaimer, the term of this patent is extended or adjusted under 35 U.S.C. 154(b) by 467 days.

(21) Appl. No.: 10/709,064

(22) Filed: Apr. 9, 2004

(65) Prior Publication Data

US 2005/0223514 A1    Oct. 13, 2005

(51) Int. Cl.
 *A47L 11/283*   (2006.01)
(52) U.S. Cl. .............................. 15/401; 15/98; 15/320
(58) Field of Classification Search .................. None
See application file for complete search history.

(56) References Cited

U.S. PATENT DOCUMENTS

| | | | |
|---|---|---|---|
| 3,065,490 A | 11/1962 | Arones | |
| 3,197,798 A | 8/1965 | Brown et al. | |
| 3,701,177 A | 10/1972 | Meyer et al. | |
| 3,702,488 A | 11/1972 | Kasper | |
| 4,158,901 A | 6/1979 | Wulff | |
| 4,173,056 A | 11/1979 | Geyer | |
| 4,363,152 A | 12/1982 | Karpanty | |
| 4,619,010 A | 10/1986 | Burgoon | |
| 5,455,985 A | 10/1995 | Hamline et al. | |
| 5,524,320 A | 6/1996 | Zachuber | |
| 5,555,596 A | 9/1996 | Knowlton et al. | |
| 5,911,260 A | 6/1999 | Suzuki | |
| 5,918,346 A | 7/1999 | Suzuki | |
| 5,993,563 A | 11/1999 | Strickland et al. | |
| RE36,565 E | 2/2000 | Burgoon | |
| 6,047,437 A | 4/2000 | Suzuki | |
| 6,073,304 A | 6/2000 | Knowlton et al. | |
| 6,108,859 A | 8/2000 | Burgoon | |
| 6,427,285 B1 | 8/2002 | Legatt et al. | |
| 6,519,808 B2 | 2/2003 | Legatt et al. | |
| 6,557,207 B2 | 5/2003 | Stuchlik | |
| D476,786 S | 7/2003 | Sakurai | |
| 6,602,018 B2 | 8/2003 | Feeny et al. | |

*Primary Examiner*—David Redding
(74) *Attorney, Agent, or Firm*—Blackwell Sanders Peper Martin LLP; Lawrence E. Evans, Esq.

(57) ABSTRACT

A floor cleaning machine is provided with at least two movable squeegees to provide coverage of the liquid applied to the floor in a path with the squeegees extending beyond the outer perimeter sides of the liquid path both during straight ahead movement and during turning maneuvers. The squeegee assemblies are carried by a chassis. A floor scrubbing device is provided to apply liquid to the floor and to mix dirt on the floor with the applied liquid. A liquid pickup device is also provided to remove the applied liquid from the floor at a position adjacent to each of the squeegee assemblies.

13 Claims, 8 Drawing Sheets

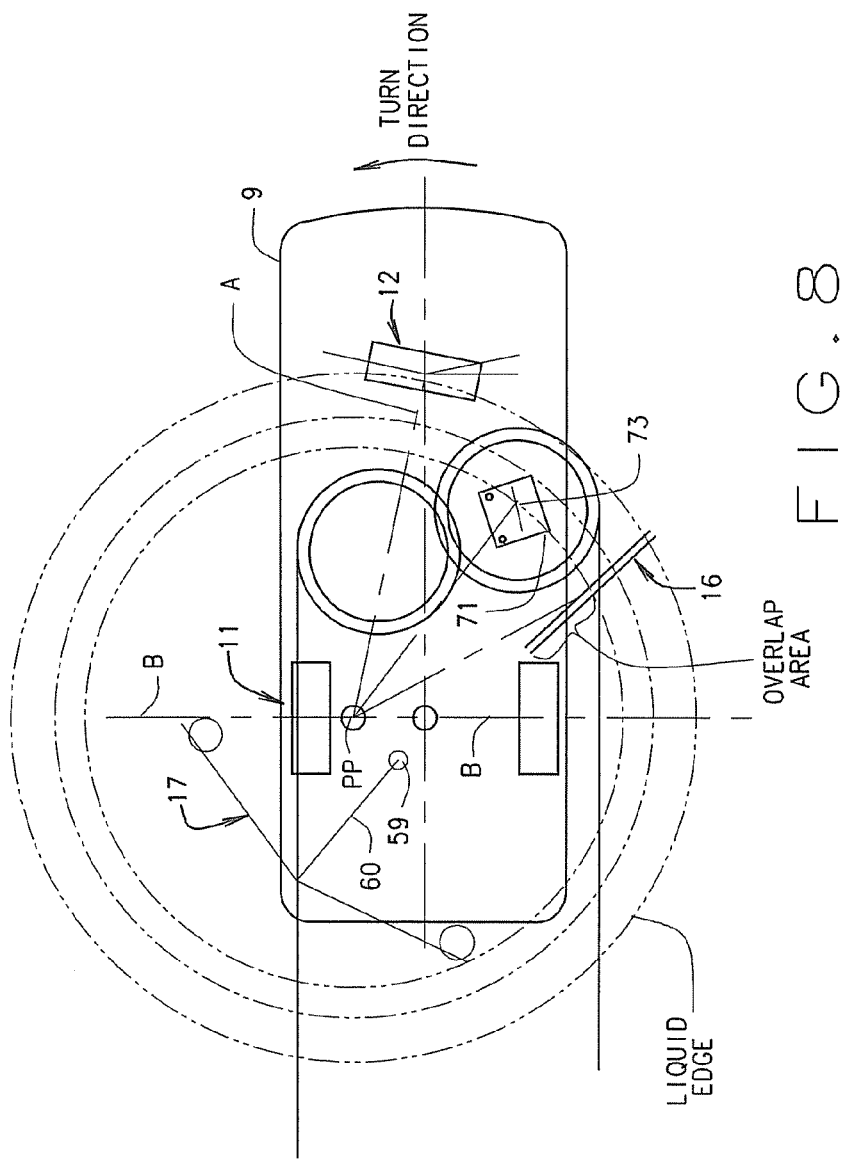
F I G. 8

FLOOR CLEANING MACHINE

BACKGROUND OF INVENTION

Floor cleaning machines and their components are well known in the art. See, for example, U.S. Pat. Nos. 6,557,207, 6,108,859, Re.36,565 and 5,524,320. Such machines may be constructed to walk behind or to carry an operator. In general, these machines include at least one scrubbing brush or pad which is adapted for engaging an underlying floor and to have its bristles move relative to the floor while applying a liquid such as water containing soap or other cleaning compounds to the floor. The brush works the applied liquid on the floor surface loosening the dirt and suspending or dissolving it in the liquid or to form a solids/liquid mixture/ solution with the dirt. A squeegee trails the brush assembly and wipes the liquid from the floor surface leaving the floor relatively dry. Usually, a vacuum is applied to the area at the blade of the squeegee to remove the liquid and dirt being wiped by the squeegee. The liquid and dirt are then transferred to a tank for storage and later discharge.

Many of these type of machines have been designed and used as is evidenced by the number of patents relating to such machines. However, the basic operating principle is generally the same. Such cleaning machines tend to have specific design features adapted for improving upon certain cleaning situations. For example, the '320 Patent discloses a machine designed to clean both narrow and wide areas as the machine moves forward. The '320 machine utilizes a main scrubber brush and two auxiliary brushes trailing behind the main brush. The auxiliary brushes are mounted on pivot arms and utilize wipers outside of the brush perimeter to direct the liquid inwardly for wiping action by the main trailing squeegee. Mechanism is provided to permit movement of the pivot arms inwardly and outwardly. When in the outward position, the auxiliary brushes provide for a wider cleaning path and while in the inner position, for example, in a narrow aisle, the brushes move inwardly providing a variable width path of cleaning. The machine of the '320 patent appears to be a walk-behind machine.

One problem with current cleaning machines is when a machine is operated to make a turning maneuver to either avoid an obstacle, change directions or move from one aisle to another aisle. When the machine is effecting a turning maneuver, the main squeegee may not be wide enough to squeegee the entire path of liquid at the brush assembly. Thus, some cleaning fluids will be left on the floor and be allowed to dry. Because dirt has been entrained in the water, the dirt will also be left on the floor. The squeegee can be made wider but the extra width limits the machine's ability to clean narrow aisles.

The present invention solves the foregoing problem by providing a floor cleaning machine construction utilizing a main squeegee with a secondary squeegee that will automatically track along a path where an outer end of the secondary squeegee will be outside of the path of applied liquid during straight and turning movement of the machine. The present invention is applicable to power driven riders and walk-behinds and push types of floor cleaning machines. The squeegees can pivot independently of each other to allow the squeegees to move out of the way when encountering an obstruction like a wall in a narrow aisle.

SUMMARY OF INVENTION

A floor cleaning machine is provided utilizing a chassis having a leading portion, a trailing portion and opposite side portions. A plurality of wheels is associated with the chassis for supporting and providing mobility to the chassis and other cleaning machine components. At least one of the wheels may be power driven and at least one of the wheels is pivotal for effecting a turning maneuver of the cleaning machine. A scrubber assembly is provided that is operable to assist in dispersing dirt on the floor in the applied liquid. Such a scrubber assembly could include one or more power operated scrubbing brushes. A liquid application device is provided for applying liquid to the floor in an area adjacent the scrubber assembly. Cleaning liquid is applied in a path as the machine moves from place to place. The path of applied liquid has a perimeter with first and second side edges, said side edges being generally straight during straight movement of this cleaning machine and curved during a turning maneuver of the machine. A first squeegee assembly is provided. The first squeegee assembly includes a first squeegee having first and second ends in a position at the trailing portion of the machine. The first squeegee that is selectively movable between first and second positions. A first end of the first squeegee extends beyond the first side of the liquid path when the machine is steered in a direction toward the first side portion of the machine and the first squeegee moves from the first position to its second position when moving generally in a straight path. A second squeegee assembly is provided having a second squeegee with first and second ends. The second squeegee is selectively movable between first and second positions. The second squeegee has its second end extend beyond the second side of the liquid path when the second squeegee is in its second position during a turning maneuver of the cleaning machine in a direction toward the first side portion of the chassis. When the machine is not making a turning maneuver and is proceeding generally in a straight line, the first and second squeegees are each in their respective first position.

In a preferred embodiment, the squeegees move between their first and second positions mainly due to the friction force applied to the squeegee by the underlying floor being cleaned. The squeegees are each movable at a respective pivot point with each squeegee assembly being provided with a pivot link connecting the respective first and second squeegee to a respective pivot.

BRIEF DESCRIPTION OF DRAWINGS

FIG. 8 is a top schematic illustration of the cleaning machine showing various arcs of movement of components of the cleaning machine during a turning maneuver.

DETAILED DESCRIPTION

Figure 1:
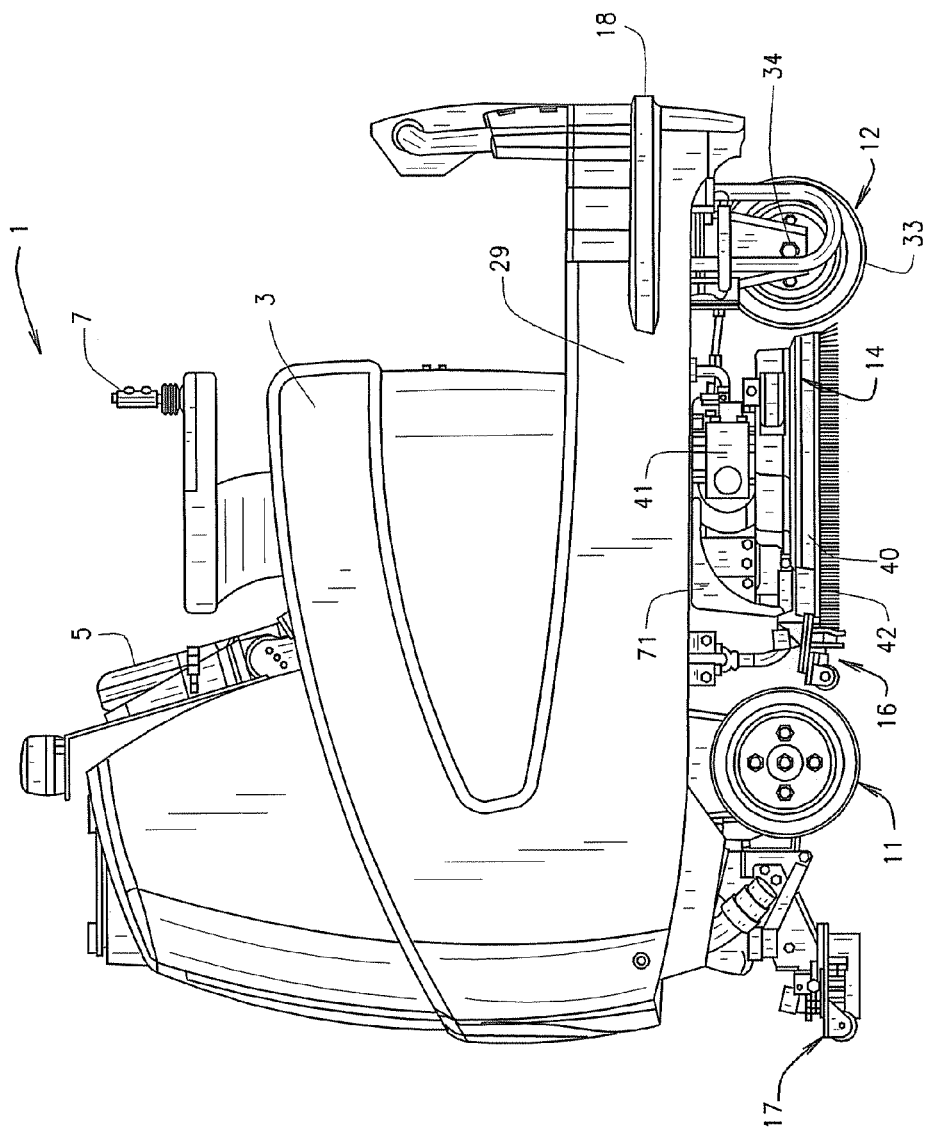
FIG. 1 is a side elevation view of a floor cleaning machine.

The reference numeral 1 designates generally a floor cleaning machine. In the illustrated structure, the cleaning machine 1 is of the rider type and includes a body, designated generally 3, used to enclose various machine components, for example, an engine or motor, vacuum pump, drive, steering mechanism and various other mechanisms utilized by the machine 1. A driver seat 5 is also provided. A steering implement 7 such as a joystick or steering wheel is positioned adjacent the seat 5 for use by an operator to maneuver the machine 1. The machine 1 need not be a rider type or power driven and may also be of the walk-behind push type. Machine 1 includes a chassis 9 which is used for mounting various of the mechanical components such as drive and steerable wheel assemblies 11, 12 respectively, a scrubber assembly 14 and squeegee assemblies 16, 17. Many additional mechanical components (not shown) of the machine 1 may also be mounted to or carried by the chassis The body 3, seat 5 and steering device 7 are also carried by the chassis 9. The machine 1 has a power drive, for example, an internal combustion engine or electric motor which electric motor could be powered by a battery system. Machine 1 is operable to move forward, rearward and effect turning maneuvers to make left or right turns in response to operation of the steering device 7. Protective bumpers 18 may also be provided.

The machine 1 is described herein in terms of its normal forward motion, unless otherwise noted, with the chassis having a normally leading portion 22 and a normally trailing portion 23 and operating on a generally horizontal floor or surface. The chassis 9 and machine 1 have opposite side portions with the chassis 9 having side portions 26, 27 and the body 3 having side portions 29, 30.

The machine 1 is provided with the plurality of wheel assemblies 11, 12. In a preferred embodiment, the wheel assembly 11 is a drive wheel assembly and is mounted rearward of the steering wheel assembly 12. It is to be noted that even though the drive wheel assembly 11 is rearward of the steering wheel assembly 11 in the illustrated embodiment, the rear wheel assembly 11 could be used for steering while the front wheel assembly 12 could be used for driving. Additionally, the steering wheel assembly 12 could be used to drive the machine 1 either alone or in combination with all the wheels being driven wheels. The steering wheel assembly 12 is operably associated with steering device 7 to effect selective turning maneuvers of the machine 1 by an operator. Further, the machine 1 could be operated robotically eliminating the need for an operator at or on the machine.

Figure 6:
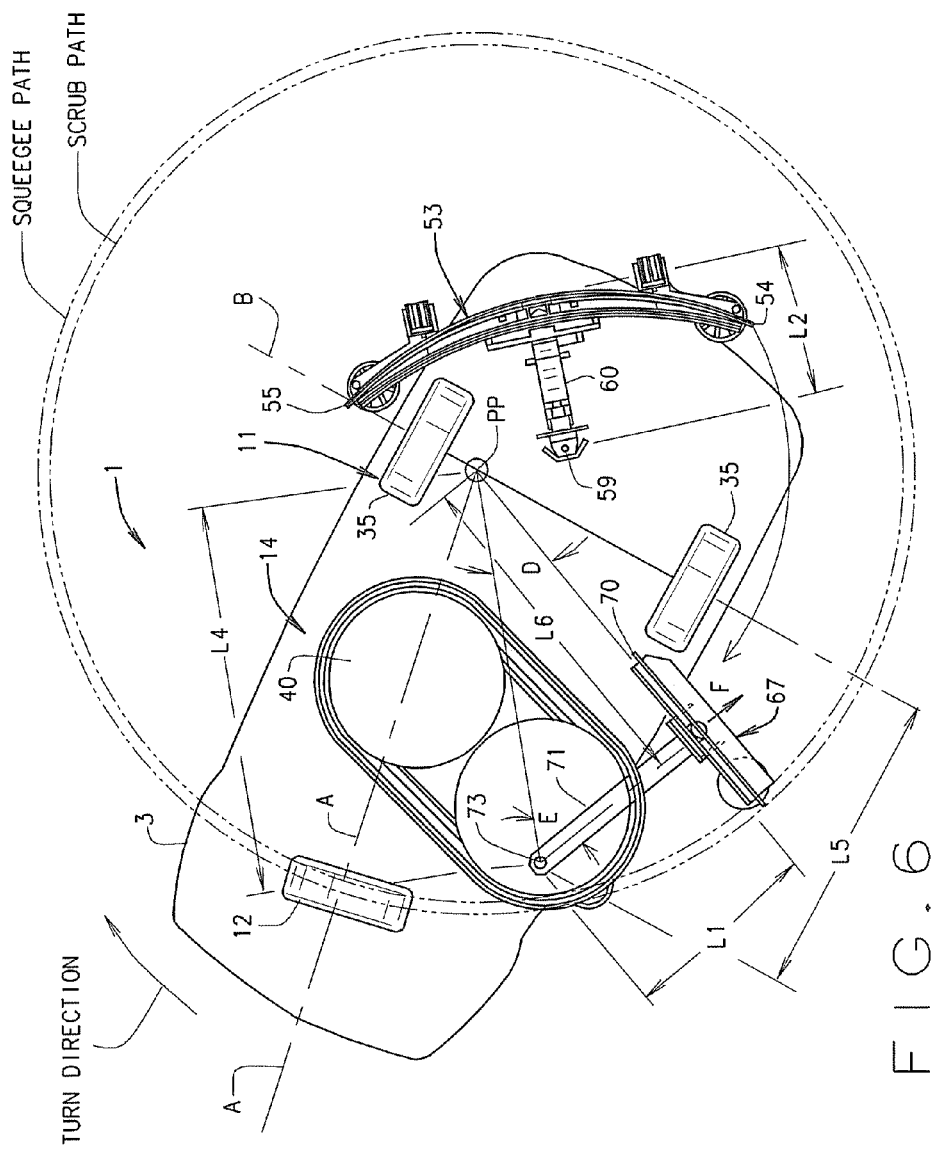
FIG. 6 is a bottom schematic view similar to FIG. 4 showing the machine in a left turn maneuver and with the squeegees being pivoted from their normal position of straight ahead movement.
Figure 7:
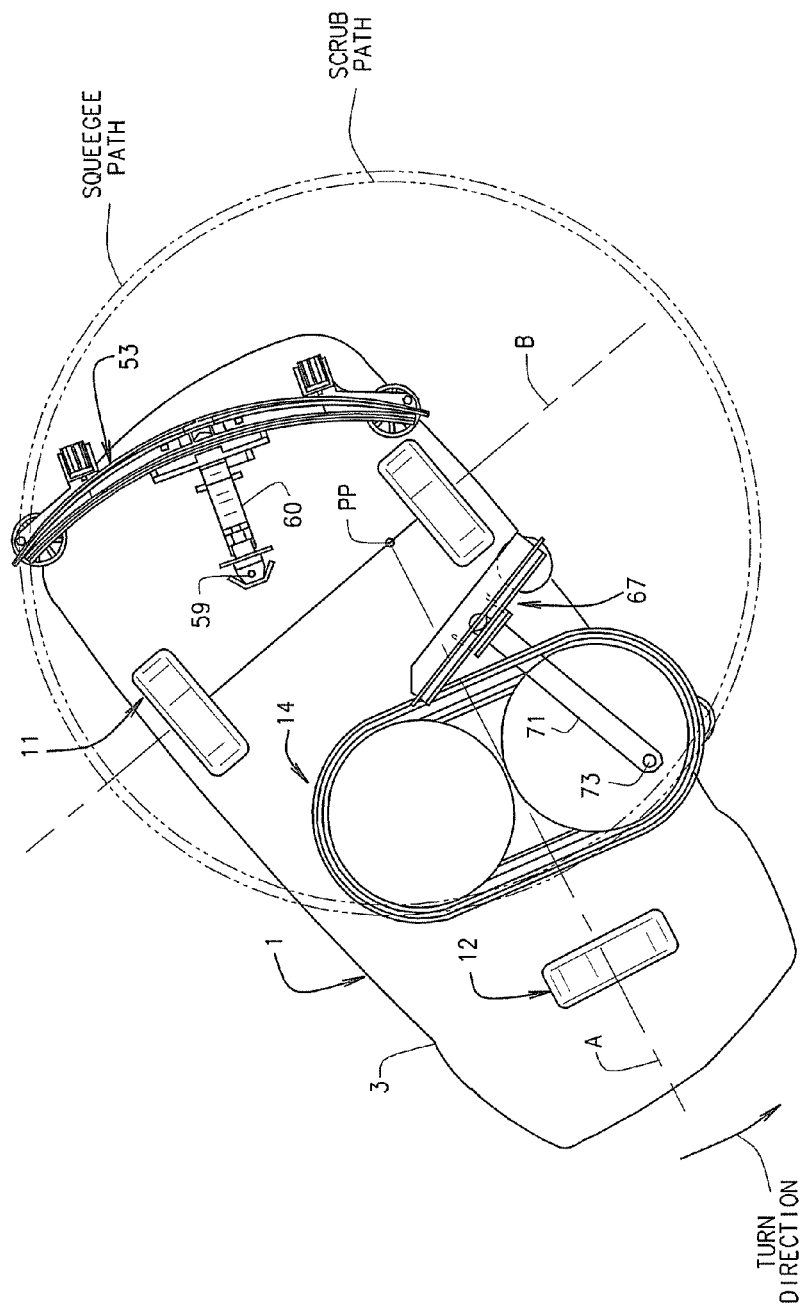
FIG. 7 is a bottom schematic view similar to FIG. 4 showing the cleaning machine in a right maneuver.

In the illustrated structure, the steerable wheel assembly 12 utilizes a single wheel 33 mounted adjacent the leading portion 22 of the machine 1. The wheel 33 is both pivotally mounted to the chassis 9 and mounted for rotation about a generally horizontal axle 34 having an axis A. The front wheel 33 pivots about a generally vertical axis to effect a turning maneuver of the machine 1 in a generally horizontal plane. The drive wheel assembly 11 in the illustrated structure includes two laterally spaced apart wheels 35 which are mounted for rotation about an axis B. The wheels 35 are preferably mounted on an axle 36 which in turn is suitably mounted to the chassis 9 and carried thereby. Preferably, the wheels 35 are fixed in their position and need not pivot but will follow the lead of the front wheel 33. As best seen in FIGS. 6, 7, the machine 1 turns about a machine pivot point PP. The pivot point PP is that point which is intersection of the axes A and B (FIG. 4) during a turning maneuver. The axis B may be considered a pivot point line since the pivot point PP lies on it. At times, the pivot point PP will be positioned between the wheels 35 particularly during a sharp turning maneuver. Components of the machine 1 will turn in an arc or follow a path in an arc about point PP during a turning maneuver as will be described in more detail below. The drive wheel assembly 11 is operably connected to the power source such as the internal combustion engine or electric motor described above.

Figure 2:
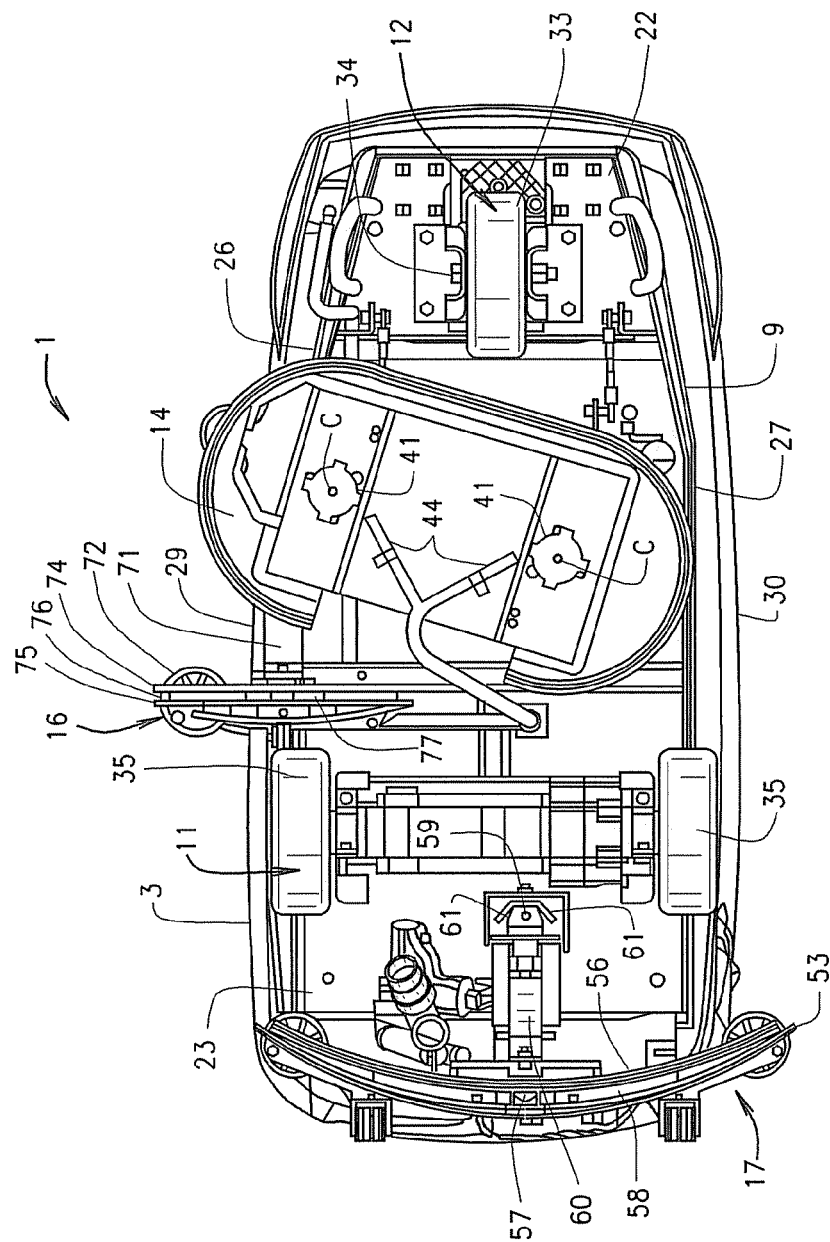
FIG. 2 is a bottom view of the floor cleaning machine of FIG. 1 with the scrubbing brushes removed.
Figure 4:
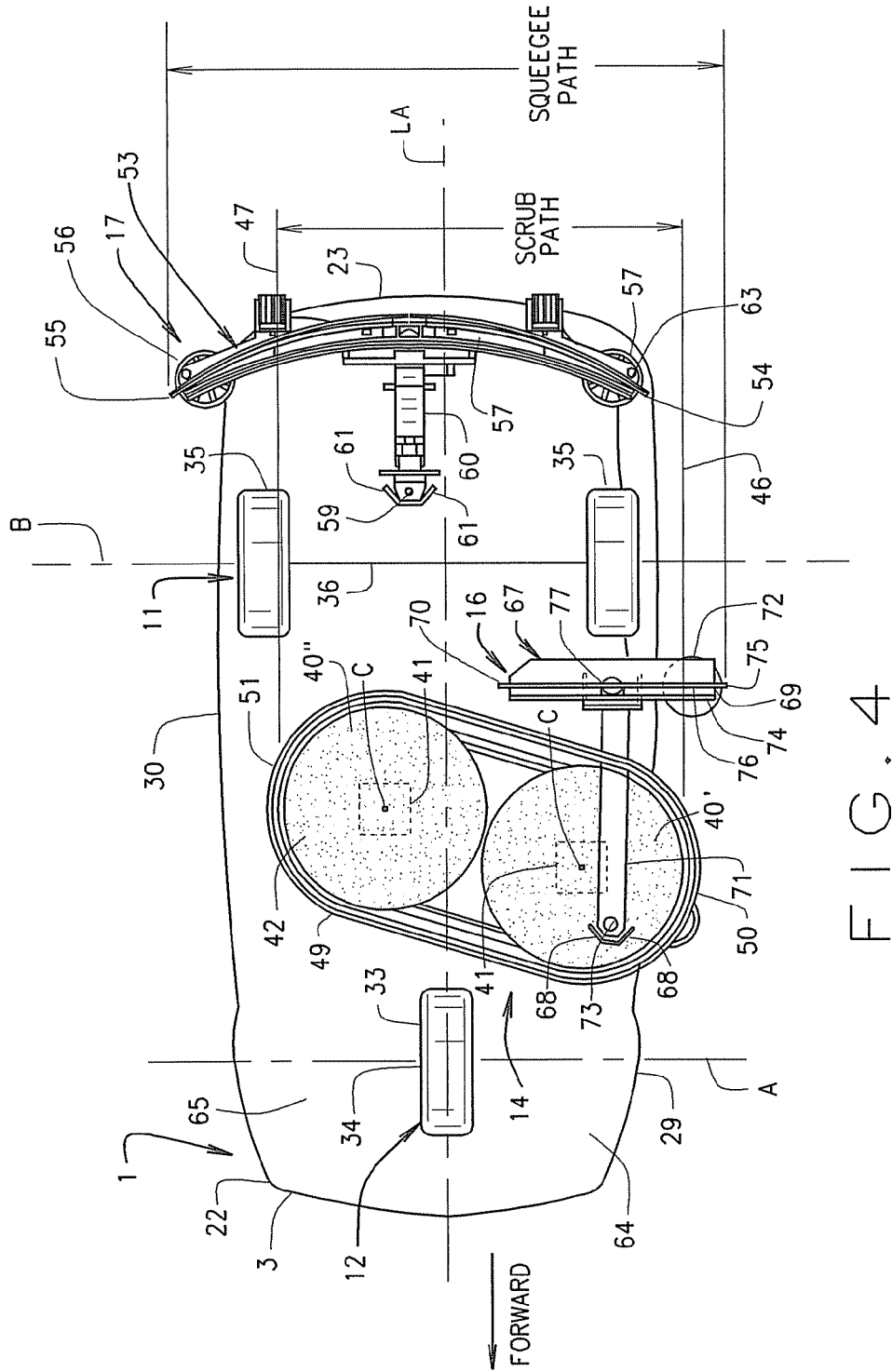
FIG. 4 is a bottom schematic view looking at the bottom side of the floor cleaning machine showing the machine as it would have the components in their normal positions with the machine moving forward in a generally straight line.

The machine 1 is provided with a scrubber assembly 14 which is preferably power operated. The scrubber assembly 14 as illustrated includes at least one scrubber brush 40 that is driven by a power drive 41 (FIGS. 1, 2) such as an electric motor or hydraulic motor which ultimately receives its power from the power source for the machine 1. The brush 40 rotates in a generally horizontal plane and has bristles 42 that engage the underlying floor for intermixing cleaning liquid with dirt on the floor. The cleaning liquid is applied or dispensed through a dispenser 44 as is well known in the art. The scrubber assembly 14 distributes the applied liquid and when the machine 1 is moving, the liquid is applied and worked in a path having a perimeter including opposite side edges 46, 47. When machine 1 is in motion in a straight line, the edges 46, 47 are also generally straight. When the machine 1 is in a turning maneuver, the edges 46 and 47 will be curved with the amount of curvature depending upon the sharpness of the turn. In the illustrated structure, the scrubber assembly 14 includes a pair of scrubber brushes 40 each brush rotating about its respective axis C which axis are generally vertical. A skirt 49 may be provided to surround the outer peripheral edges of the brushes 40 to shield articles such as walls, footboards and the like from contact with the bristles 42. The skirt 49 may also be used to contain spray from the rotating brushes 40 and contain the distribution path of the liquid from the liquid dispenser 44. At least one of the brushes 40 (differentiated as brushes 40', 40"), and as seen in FIG. 4, the right-hand brush 40' (right-hand from the top of the machine) has its peripheral edge 50 extend outwardly of the side edges 29, 26 of the body 3 and chassis 9 to effect close-up cleaning to walls and the like. Thus, the path of liquid extends beyond at least one of the side edges of the machine 1 and chassis 9 in the illustrated embodiment. As shown, the second brush 40" has its peripheral edge 51 inboard of the outside edge 30 of the body 3. However, it is to be understood that the position of the outside edges of the scrubber assembly 14 and its brushes 40 may provide other positions for the side edges 50, 51 if desired. The scrubber assembly 14 may be mounted for side-to-side movement if desired. For example, both of the peripheral edges 50, 51 may be inboard of the sides 29, 30 of the body 3 or both may be outboard of the sides of the body 3. The use of a plurality of brushes 40 allows the use of smaller diameter brushes while still maintaining a wide cleaning path. The brushes 40 may rotate in the same direction or in opposite directions and preferably rotate to bring the liquid that is dispensed inwardly at the leading edges toward the central portion of the machine 1. The machine 1 has a longitudinal axis LA and the brushes preferably rotate in a direction to move the liquid on the leading edge of the scrubber assembly 14 inwardly toward the longitudinal axis. Other scrubbing devices may be used with or in place of the brushes 40. For example, high velocity liquid jets, cylindrical brooms, scrubbing pads and the like could be used.

The machine 1 is provided with a squeegee assembly 17. The first squeegee assembly 17 includes a squeegee 53 preferably mounted at the rear or trailing portion of the machine 1. The squeegee 53 has first and second ends 54, 55 with the end 54 being an outboard end and the end 55 being an inboard end. The end 54 during normal forward motion extends outwardly of the outside edge of the edge 51 of the scrubber assembly 14 and outside of the edge 47 of the liquid in the path. Preferably the squeegee 53 is curved with the ends 54, 55 leading the center portion of the squeegee 53. The squeegee 53 is mounted for movement between the first and second positions with the first position being as seen in FIG. 6 and the second position as being seen in FIG. 7. Movement of the squeegee may be effected by the squeegee 53 encountering an obstacle at or adjacent to the end of 55 allowing the squeegee 53 to move in a direction to avoid the obstacle, for example, a shelf corner or a wall. Guard rollers 56, 57 may be provided to help reduce friction during contact with an obstruction. The squeegee 53 is mounted so that a lower edge of the squeegee will engage the floor. Liquid cleaned by the squeegee 53 is then extracted adjacent the leading edge of the squeegee by a vacuum pick up 57. A channel 58 is formed and a wall member 56 positioned in front of and spaced from the squeegee blade 63 so vacuum may be applied along the length of the squeegee blade 63.

In a preferred embodiment, the squeegee 53 moves between its first and second positions about a pivot 59 and in normal forward motion the squeegee is in an intermediate position between the first and second positions. Stops 61 may be provided to limit the amount of movement of the squeegee 53 and define the outer limits of the first and second positions. The squeegee 53 is mounted to the pivot 59 by a link 60. The pivot 59 is preferably equidistant from the opposite ends 54, 55. Preferably, the link 60 is in the form of an arm extending between the pivot 59 and the center of the squeegee 53. The squeegee assembly 17 may also be provided with support wheels 62 to help support the squeegee 53 and its squeegee blade 63 and to allow the proper amount of deformation of the squeegee blade when it is in contact with an underlying floor. The squeegee blade 63 is preferably made from a polymeric or elastomeric material as is well known in the art.

The longitudinal axis LA of the machine 1 divides the machine 1 into first and second side potion 64, 65 respectively. In a preferred embodiment, the pivot 59 is mounted on the side portion 65 of the longitudinal axis LA for a purpose later described. Also in a preferred embodiment, the pivot 59 is mounted rearwardly of the axis B for a purpose later described. The end 54 of the squeegee 53 is normally positioned on the side portion 64 of the longitudinal axis LA while the end 55 is positioned on the side portion 65. During forward movement of the machine 1, the squeegee 53 trails the pivot 59 and the pivot 59 moves along a straight path generally parallel to the longitudinal axis LA. A line drawn between the ends 54, 55 would be generally perpendicular to the longitudinal axis LA during straight forward movement of the machine 1. When the squeegee 53 is symmetrical about its center point, the center point is in line with the pivot 59. A line between the center point and the pivot 59 would be generally parallel to the longitudinal axis LA during straight forward motion and the machine 1. During a turning maneuver, the squeegee 53 and the link 60 will pivot relative to the longitudinal axis LA trailing the pivot 59 due to the friction between the squeegee blade 63 and the underlying floor. The line between the pivot 59 and center point of the squeegee 53 will be generally tangent to or normal to a line between the pivot 59 and the pivot point PP. With the pivot 59 trailing the axis B, the squeegee 53 will pivot in a direction opposite to the pivoting of the machine 1 about the pivot point PP.

A second squeegee assembly 16 is provided. The squeegee assembly 16 includes a squeegee 67 mounted for movement between first and second positions. In normal forward movement, the squeegee 67 is in an intermediate position between the first and second positions. Stops 68 may be provided to limit the amount of movement the squeegee 67 can make and thus define the outer limits of the first and second positions of movement. The squeegee 67 has opposite ends 69, 70. A link 71 connects the squeegee 67 to a pivot 73 with the link 71 being connected to the squeegee 67 intermediate the ends 69, 70. A friction reduce wheel or roller 72 may be provided at the end 69 and mounted on the squeegee to protect obstacles or walls should there be engagement with the squeegee assembly 16. The squeegee 67 is provided with a squeegee blade 75 for contact with the underlying floor or surface to be cleaned. Preferably, the blade 75 is of an elastomeric or polymeric material. Preferably, the blade 75 is generally normal or perpendicular to a line between the pivot 73 and the center of the blade 75. The blade 75 is also preferably generally perpendicular to the direction of straight forward movement of the machine 1. Alternatively, the blade 75 may be inclined from its outer end 69 backwardly and inwardly toward the longitudinal axis LA and the end 70 of the squeegee 67. An inclined orientation will bias flow of liquid toward the central portion of the machine 1 during forward movement of machine 1. A vacuum pickup 77 is also provided for the squeegee 67 to remove liquid from in front of the blade 75. A channel 76 is formed between the squeegee blade 75 and a wall member 74 positioned in front of and spaced from the squeegee blade 75 so vacuum may be applied along the length of the squeegee blade 75.

Preferably, the pivot 73 is positioned forwardly of the axis B. By having the pivot 73 forwardly of the axis B, the outboard end 69 extends beyond the edge 46 of the liquid during both straight forward movement of the machine 1 and during a turning maneuver of the machine 1. By having the pivot 73 forward of the axis B, the link 71 and squeegee 67 will pivot about the pivot 73 clockwise relative to the machine 1 when the machine 1 turns clockwise and counter-clockwise during counter-clockwise turning of the machine 1. Thus, the end 69 will remain outwardly of the edge 46 irrespective of the direction of movement of the machine 1, In a preferred embodiment, the pivot 73 is mounted to the scrubber assembly 14. The inboard end portions of the squeegees 53, 67 adjacent their ends 54, 70 overlap the liquid path both during straight forward movement of the machine 1 and during turning maneuvers of the machine 1, thereby preventing a portion of the trail of liquid not being contacted by the squeegee blades 63, 75. As shown, the squeegee 67 and blade 75 trail the rear or trailing portion of the brush 40' to which the pivot 73 is associated. Preferably, the blade 75 and squeegee 67 trail the trailing edges of both brushes 40. Preferably, the pivot 73 is on or adjacent the carrier for the leading brush 40' and positioned on the side of the longitudinal axis LA the leading brush axis of rotation is on. Preferably, the pivots 59, 73 are on opposite sides of the longitudinal axis LA.

FIG. 6 shows the position of the squeegees 53, 67 during a turning maneuver in one direction, clockwise as seen in the Figure. As seen, the rear squeegee 53 has its end 55 pivoted outwardly with the link 60 and squeegee 53 being pivoted counter-clockwise relative to the machine 1 with the machine 1 making a clockwise turn, as seen from the bottom of the machine. The squeegee 53 pivots during the turn to a position to pick up liquid out to its end 55 while the ends 54, 70 provide an overlap during the turn. The squeegee 67 and link 71 are pivoted clockwise relative to the machine 1 during the clockwise movement of the machine 1. In a sharp turn, the pivot point PP is between the rear wheels 35 and is at a point at the intersection of the axis A and axis B. If the machine 1 turns in the opposite direction (FIG. 5), the rear squeegee 53 and squeegee 67 will pivot in opposite directions relative to the chassis 9 as just described. The lengths L2, L1 of the links 60, 71 respectively (i.e., the distance between their respective pivot points and the squeegees 53, 67 is important in order to maintain compactness of the machine 1 and proper pivoting movement). The length L1 of the link 71 is such as to prevent interference of the squeegee assembly 16 with the wheels 35 and has a length less than length L5 (the distance between the axis B and the center of pivot 73) and the length L4 (the distance between the center of pivot 73 and the pivot point PP which is not a fixed distance). The length L2 of the link 60 is also such as to prevent interference between a rear wheel 35 and the squeegee assembly 17 during pivoting and is short enough to reduce the risk of damage during a backing maneuver In general, the longer L1 and L2 are, the less the links 71, 60 will pivot during a turning maneuver and the less the squeegee assemblies 16, 17 will swing inwardly and outwardly. In a turning maneuver, the sharper the turn, the shorter L4 ad L6 become. The angle D as seen in FIG. 6 is preferably less than the angle E both during turning and in a straight-ahead forward motion. In straight-ahead motion, it can be considered that the angle D is zero degrees, while the angle E would be 90 degrees. The sharper the turn, the smaller the angle D becomes and the larger angle E becomes. Preferably, angle D is in the range of between 0° and about 45° for both straight-ahead motion and during a turning maneuver. F represents the direction of the friction force from the floor on the squeegee assembly 15. During the turning maneuvers, the inboard end 54 of the squeegee 53 extends outwardly of the path of movement of the inboard end 70 of the squeegee 67.

In a preferred embodiment, the wheels 35 are in laterally spaced relationship with the longitudinal axis LA extending therebetween. The pivot 73 is on one side of the longitudinal axis while the pivot 59 is on the opposite size of the longitudinal axis. The spacing of the pivot 59 from the pivot point PP is closer than the spacing between the pivot point PP and the pivot 73 during straight ahead movement and in a turn in a direction away from the pivot 73. The spacing of the pivot 59 from the PP is at least initially farther than the spacing between the pivot point PP and the pivot 73 during a turn in the direction toward the pivot 73. Also, in a preferred embodiment, the pivot 73 is outboard of the axis of rotation of a brush 40 and is on the same side of the longitudinal axis LA as the squeegee 67.

Figure 3:
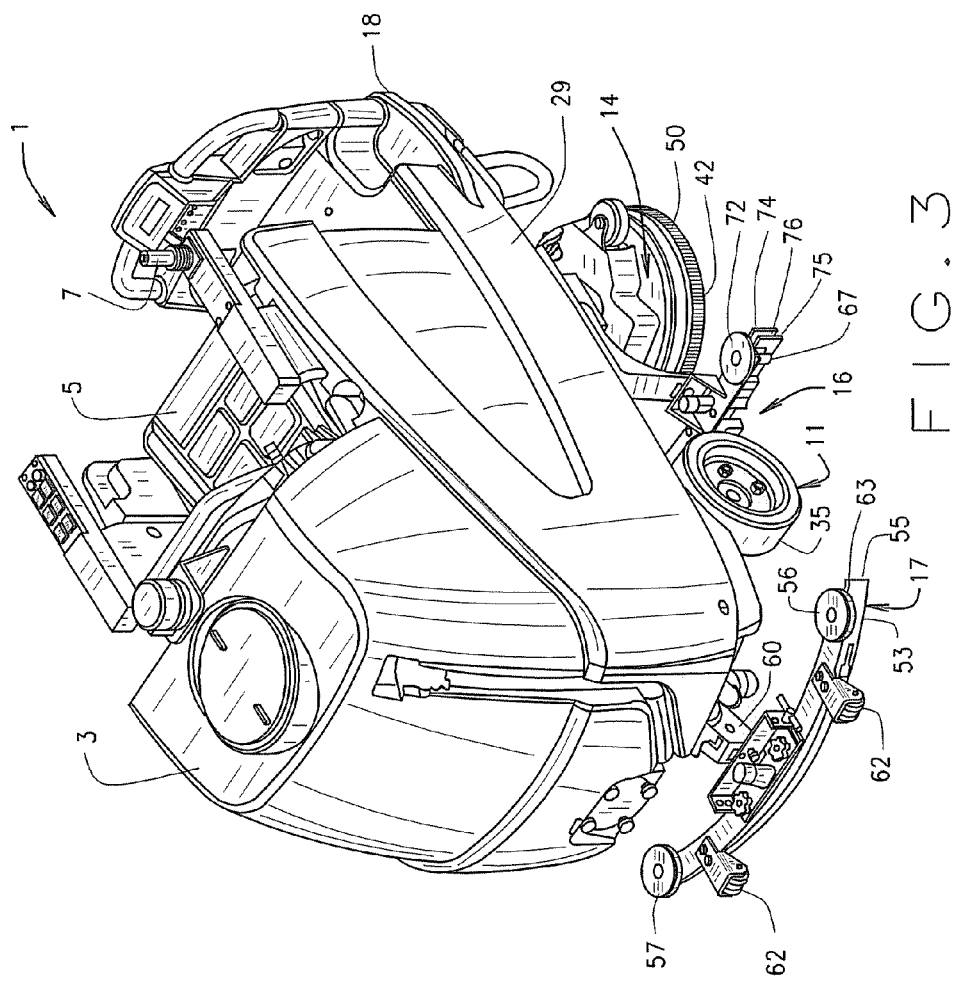
FIG. 3 is a perspective view of the floor cleaning machine of FIG. 1.
Figure 5:
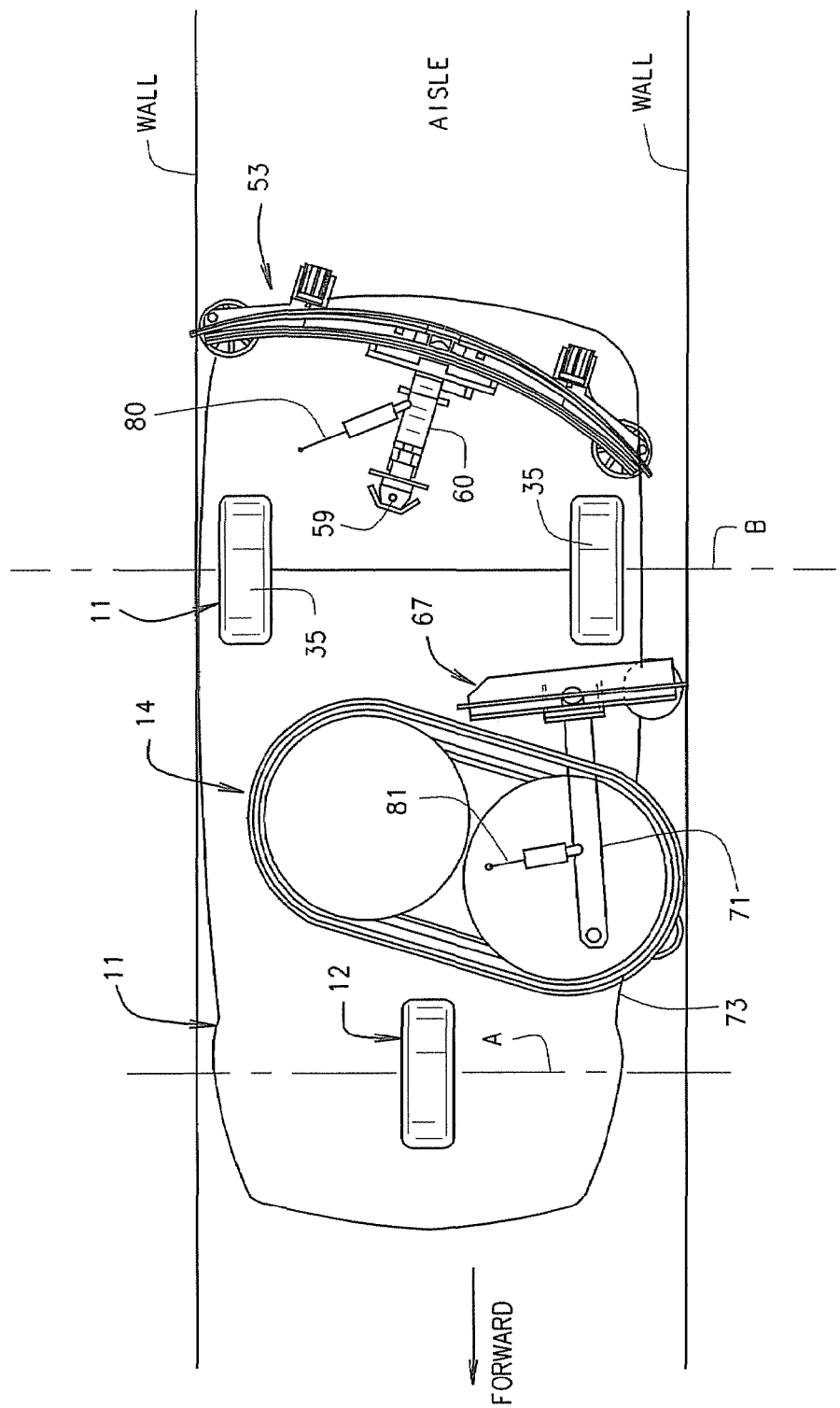
FIG. 5 is a bottom schematic view similar to FIG. 4 showing the machine passing through a narrow passage with the first and second squeegees being shown in positions to accommodate the narrow passage by pivoting about their respective pivot.

The preferred embodiment is described above and utilizes friction, in the direction of F, between the squeegee blades 63, 75 and the underlying floor to effect pivoting of the links 60, 71. Such an arrangement and construction provides for an efficient and simple machine. However, it is to be understood that the links 60, 71 may be pivoted about their respective pivots 59, 73 via power operated mechanism 80, 81, for example, an air cylinder, a rack and pinion drive, a screw drive, hydraulic drive, or the like (FIG. 5). Preferably, such a mechanism, which is shown in phantom in FIG. 3 would be operably connected to the steering mechanism such that when the steering mechanism is operated for a left or right turn, the links 69, 71 will pivot in their respective directions to effect movement of the squeegees in the manner described above. The operation of such a power-assisted movement of the links is as described above.

FIGS. 6 and 7 show both the squeegee path for squeegee blades 63 (FIG. 7) and 75 (FIG. 6) outboard ends 55, 69, and the outer perimeter of the path of the scrubber assembly 14 (scrub path) during turning maneuvers. FIG. 4 illustrates the squeegee and scrub path for straight forward motion. FIG. 5 illustrates inboard positions for the squeegee assemblies 16, 17 traversing a narrow passage such as an aisle or hall. While preferred embodiments in particular applications of this invention have been shown and described it will be apparent to those skilled in the art that many other modifications in applications of this invention are possible without the departing from the inventive concepts herein. It is therefore, to be understood that, within the scope of the appended claims, this invention may be practice otherwise than as specifically described, and the invention is not to be restricted except in the spirit of the appended claims.

The invention claimed is:

1. A floor cleaning machine comprising:
a chassis having a leading portion and a trailing portion and first and second side portions;
a plurality of wheels associated with the chassis, at least one of the wheels being pivotal for steering the cleaning machine;
a scrubber assembly operable to scrub a floor, said scrubber assembly positioned at the leading portion, said scrubber assembly being operable to apply a liquid to a floor in a path having a perimeter with first and second sides;
a first squeegee assembly with a first squeegee having first and second ends, said first squeegee being positioned at the trailing portion and being selectively movable between first and second positions, said first end extending beyond the first side of the path during a turning maneuver of the machine in a direction of the first side portion and the first squeegee is moved from its first position to its second position; and
a second squeegee assembly with a second squeegee having first and second ends and being selectively movable between first and second positions, said second squeegee having its second end extend beyond the second side of the perimeter of the path when the second squeegee is in its second position during a turning maneuver of the machine in a direction toward the first side portion of the chassis and wherein, when the machine is not making a turning maneuver, the first and second squeegees are each in their respective first position.

2. A cleaning machine as set further in claim 1 wherein the second squeegee assembly including a pivot member connected to the second squeegee and pivotally carried by the chassis.

3. A cleaning machine as set forth in claim 2 wherein the second squeegee is positioned forwardly of a turning pivot point of the machine.

4. A cleaning machine as set forth in claim 3 wherein the scrubber assembly includes at least one brush and said second squeegee trails the least one said brush and the pivot point of the pivot member is normally forward of a central axis of the at least one brush the second squeegee trails.

5. A cleaning machine as set forth in claim 1 wherein the machine has a generally central longitudinal axis, dividing the machine into first and second sides.

6. A cleaning machine as set forth in claim 1 wherein the first end of the second squeegee extends normally inwardly of the second end of the first squeegee to provide overlap on the liquid path.

7. A cleaning machine as set forth in claim 6 wherein the path of movement of the first end of the second squeegee is inwardly of the path of movement of the second end of the first squeegee during a substantial portion of movement of the machine during a turning maneuver.

8. A scrubbing machine as set forth in claim 1 wherein the plurality of wheels includes a forward wheel and at least two rear wheels, said forward wheel being pivotally associated with the chassis, said at least two rearward wheels being in spaced relationship to one another with at least one rearward wheel being positioned on each of opposite sides of a longitudinal axis of the machine, at least one of the wheels being a power driven wheel.

9. A cleaning machine as set forth in claim 8 wherein the machine turns about a machine pivot point during a turning maneuver, a portion of the first squeegee assembly pivots about a first pivot point positioned rearward of an axis of rotation of the rearward wheels and the second squeegee assembly pivots about a second pivot point positioned forward of the axis of rotation of the rearward wheels.

10. A cleaning machine as set forth in claim 9 wherein the at least two rearward wheels rotate about the axis of rotation and the machine pivot point is positioned generally along the axis of rotation.

11. A cleaning machine as set forth in claim 10 wherein said scrubber assembly includes at least one brush operable to rotate in a generally horizontal plane about a brush axis, said second pivot being normally forward of the at least one brush axis.

12. A scrubbing machine as set forth in claim 11 wherein the scrubber assembly including at least one additional brush with an axis of rotation with one brush axis of rotation being on each side of a longitudinal axis of the scrubbing machine.

13. A scrubbing machine as set forth in claim 12 wherein one of said brushes is a leading brush and the second pivot point is pivoted on the side of the longitudinal axis the leading brush is located on.

* * * * *

UNITED STATES PATENT AND TRADEMARK OFFICE
CERTIFICATE OF CORRECTION

| | | |
|---|---|---|
| PATENT NO. | : 7,185,397 B2 | Page 1 of 1 |
| APPLICATION NO. | : 10/709064 | |
| DATED | : March 6, 2007 | |
| INVENTOR(S) | : William R. Stuchlik | |

It is certified that error appears in the above-identified patent and that said Letters Patent is hereby corrected as shown below:

Col. 3, line 23, delete "chassis The body" and replace with -- chassis 9. The body --

Signed and Sealed this

Twenty-fourth Day of April, 2007

JON W. DUDAS
*Director of the United States Patent and Trademark Office*